(12) United States Patent
Cousineau (10) Patent No.: US 12,169,396 B2
(45) Date of Patent: Dec. 17, 2024

(54) METHOD FOR ANALYZING A PROGRAMMABLE LOGIC CONTROLLER PROGRAM

(71) Applicant: Mitsubishi Electric Corporation, Tokyo (JP)

(72) Inventor: Denis Cousineau, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 370 days.

(21) Appl. No.: 17/788,625

(22) PCT Filed: Dec. 23, 2020

(86) PCT No.: PCT/JP2020/049302
§ 371 (c)(1),
(2) Date: Jun. 23, 2022

(87) PCT Pub. No.: WO2021/199552
PCT Pub. Date: Oct. 7, 2021

(65) Prior Publication Data
US 2023/0030253 A1    Feb. 2, 2023

(30) Foreign Application Priority Data

Mar. 31, 2020   (EP) ..................................... 20315085

(51) Int. Cl.
| | | |
|---|---|---|
| *G05B 19/04* | (2006.01) | |
| *G05B 19/042* | (2006.01) | |
| *G06F 8/41* | (2018.01) | |

(52) U.S. Cl.
CPC ......... *G05B 19/041* (2013.01); *G05B 19/042* (2013.01); *G06F 8/42* (2013.01)

(58) Field of Classification Search
None
See application file for complete search history.

(56) References Cited

U.S. PATENT DOCUMENTS

2022/0137586 A1* 5/2022 Cousineau ........... G05B 19/056
700/86

OTHER PUBLICATIONS

International Search Report (PCT/ISA/210) issued in PCT/JP2020/049302, dated May 7, 2021.
Written Opinion of the International Searching Authority (PCT/ISA/237) issued in PCT/JP2020/049302, dated May 7, 2021.

* cited by examiner

*Primary Examiner* — Ryan A Jarrett
(74) *Attorney, Agent, or Firm* — Birch, Stewart, Kolasch & Birch, LLP (57) ABSTRACT

It is disclosed a PLC Program analysis method where a program is translated into a program model in a logical framework, from which properties are determined. Said properties coupled with interlocking properties are verified by an automated solver. If contraposition of a property is satisfiable, counter-examples representative of model's inputs and internal memory values is provided. Counter-examples are translated into error initial configurations of said model. Execution of the model is simulated with said model error initial configurations, and error intermediary configurations of said model simulation are recorded up to said property violation. Error initial and intermediary configurations of said original program are derived from error initial configurations of said model and error intermediary configurations of said model simulation and displayed. An apparatus for executing said method is provided.

10 Claims, 6 Drawing Sheets

```
module ProgPou use export ladder_overflow.Ladder type inputs = {
    x0 "model" "model_trace:.X0" : pulse
} type in_outputs = {
    d1 "model" "model_trace:.D1" : int
} type outputs = int type result_t = {
    f_outs "model" "model_trace:.F_outs" : outputs;
    f_in_outs "model" "model_trace:.F_in_outs" : in_outputs
} let progPou_scan (last_outs "model" "model_trace:new" : outputs)
                 (last_in_outs "model" "model_trace:last" : in_outputs)
                 (ins "model" "model_trace:last" : inputs)
  requires { "model_vc" ((0 <= last_in_outs.d1) /\ (last_in_outs.d1 <= 65535)
              )
  }
  =
  let common_1 = ins.x0 in
  let d1_1 = "expl:16" inc_16u (False) (common_1) (last_in_outs.d1) in
  let common_2 = ins.x0 in
  let d1_2 = "expl:16" inc_16u (False) (common_2) (d1_1) in
  let common_3 = ins.x0 in
  let d1_3 = "expl:16" inc_16u (False) (common_3) (d1_2) in
  { f_outs = 0; f_in_outs = { d1 = d1_3 } } end
```

FIG. 4b

|| X ||     ->     0 <= || D1 || <= 9999

METHOD FOR ANALYZING A PROGRAMMABLE LOGIC CONTROLLER PROGRAM

TECHNICAL FIELD

The present invention relates to methods and apparatuses for analysing a program written in a language described in the IEC 61131-3 standard. Such a program is intended in particular for a Programmable Logic Controller (PLC) to carry out the control of industrial systems.

The present invention relates more particularly to a method and apparatus for analysing, detecting and correcting errors in such a PLC program.

BACKGROUND ART

Programmable logic controllers (PLC) are industrial digital computers used as automation controllers of manufacturing processes, such as assembly lines or robotic devices. PLCs are provided with software that computes outputs from the values of inputs and internal memory, and have therefore replaced hard-wired relays, timers and sequencers. The standard IEC 61131-3 describes different programming languages used to program PLCs such as: Ladder logic (Ladder), Instruction List (IL), Structured Text (ST), Sequential function chart (SFC) and Function Block Diagram (FBD). In particular, Ladder language, also known as Ladder Logic, is a programming language used to develop PLCs software. This language uses circuits' diagrams of relay logic hardware to represent a PLC program by a graphical diagram.

A part of a software development process is dedicated to the functional specification. In the present disclosure of the invention, functional specifications are also referred to as user specifications. The functional specification usually consists of a document written in natural language and specifies what the program is meant to do. The functional specification describes the functions that the program is expected to perform. The software is then developed with a program written according to the functional specification.

Another part of a software development process is dedicated to debugging. Debugging consists in checking that a program behaves safely and according to the given specifications in the functional specification document. Debugging needs to be performed before implementation in production environment, since bugs in factories can be extremely expensive in terms of human and material damages, and plant closing time. Bugs can be costly in Factory Automation systems as well, in terms of down-time and sometimes human and hardware damages.

There are different types of tests configured for debugging a program.

The first type relates to unitary tests and integration tests, and consists in checking the behaviours and common interactions of the different components. These tests are configured to detect programming errors that lead to runtime errors in particular.

The second type of tests relates to system tests—also called functional tests—and acceptation tests, and consists in detecting errors regarding the functional specification of the program. Functional tests evaluate if the program is written in compliance with the requirements specified in the functional specification. Functional tests thus allow verifying that the program behaves correctly and safely from the perspective of the end-user and according to business requirements.

The usual method for running tests on a program is the simulation method, which consists in setting some tests defined by initial configurations and executing the program on said tests to check its behaviour under these configurations. The program is usually executed in a software simulation of the factory.

The main drawback of such debugging method is that it is not exhaustive and is time-consuming and therefore costly. This non-exhaustivity makes it quite impossible to guarantee that the selected tests cover all possible executions of a program once in production environment. Bugs can remain in the program after the testing phase, since the only guarantee is that the program doesn't bug for the tested configurations.

Model-checking method consists in consecutively executing a model of the program to test, instead of the program itself in order to save time and resources. However, execution paths-related complexity is often exponential especially for industrial applications. Testing efficiency is limited by CPU time and, therefore, this method is still not exhaustive.

Moreover, tests are partially or fully developed and run manually, since at least some configurations need to be manually defined to generate and execute said tests. Although part of tests generation and execution can be automated, another drawback of such a method is that output values of the test still must be analysed by programmers, the only available information about the bug being the initial configurations of inputs and internal memory that lead to the bug. It is therefore often hard to understand the fundamental reason of the error and why the considered initial configuration leads to that error at some point of the program.

Another drawback of this approach is that the bug can stem from the way the tests are developed regarding the functional specifications.

Firstly, writing a functional specification in natural language is unprecise and can be ambiguous. Even though some standardized ways to express specifications in natural language may have emerged, such method may yield ambiguousness both at implementation time where a developer could misunderstand the specification and write irrelevant code, and at testing time where a tester could set up inadequate tests due to a misunderstanding of the specification.

Secondly, writing a functional specification in natural language is time-consuming. But most importantly, this document is also intended for test engineers who need to read and interpret it in order to build appropriate functional and approbation tests. All those phases are time-consuming and therefore expensive.

Thirdly, such a methodology is not exhaustive, since the ambiguity that comes from the use of natural language may entail some unspecified parts during the tests development process. This failure to provide unambiguous functional specifications adds to the exhaustiveness issue encountered in test-based debugging processes. All possible executions of the software cannot be tested, and bugs can remain in the code, even after passing successfully the tests.

Some methods have been developed to express functional specifications in an explicit way in order to develop tests without a risk of misinterpretation during the testing step. Some of these methods are based on formal methods which allow expressing temporal specifications in a very precise and explicit way. However, such methods are hard to manipulate, especially for regular engineers since logics knowledge is often necessary to properly use these methods. An example consists in providing a template of predefined specifications, such as natural language sentences with blanks to fill. However, such method is only applicable to temporal specifications. Temporal specifications can be verified with un-exhaustive formal methods only, like the model-checking method which applies to a formal model and not to a program directly.

An objective of the present disclosure is to provide a solution for verifying exhaustively a Programmable Logic Controller Program that guarantees that all possible executions of a program are covered.

SUMMARY OF INVENTION

According to one aspect of the present invention, it is disclosed a Programmable Logic Controller Program analysis method comprising the following steps:
- translating an original program of the type of a Programmable Logic Controller Program, into a program model in a logical framework;
- translating, based at least on said program model, user specifications into a specification model in a logical framework;
- determining, from at least said program model and predefined language formalization, a set of properties on internal variables of said original program;
- verifying, by an automated solver, satisfiability of said set of properties coupled with interlocking properties obtained from the specification model and providing, if contraposition of a property from said set of properties is satisfiable, a set of counter-examples representative of program model's inputs and internal memory values for which said property contraposition is satisfiable, or providing, if said set of properties is always satisfied, confirmation thereof;
- translating counter-examples, into error initial configurations of said program model, said initial configurations comprising initial values of inputs and internal memory;
- simulating the execution of the program model with error initial configurations of said program model, and recording error intermediary configurations of said program model simulation, from the beginning of execution up to said property violation, said intermediary configurations comprising intermediary values of internal memory;
- translating error initial configurations of said program model and error intermediary configurations of said program model simulation, into error initial and intermediary configurations of said original program; and displaying said program error initial and intermediary configurations.

Under these dispositions, a bug occurs when one or several properties relative to the program is/are violated. A property relates to the values of inputs, outputs and local memory of the program. The present invention allows detection of such violations before execution of the program in a simulated or real environment. The method consists in finding initial values of inputs and local memory which lead to an error during execution of the program. The debugging is automated and accelerated. The method is exhaustive as it guarantees that no execution configuration would violate the program properties if no error scenario is found with the described method. Indeed, in the prior art, even if no property violation is detected during the execution of tests, there is no guarantee that the property will hold for all possible executions.

More particularly, the invention provides a solution to unambiguously express functional specifications of a PLC program and to fully automate and accelerate the verification of such functional specification.

Since the specification model is expressed in a logical framework, the verification of the satisfiability of said set of properties coupled with the specification model guarantees that if no specification violation is found, then no execution of the program can violate the specification at production time.

The specification model is then automatically verified during the satisfiability verification step. The use of deductive verification during this verification step ensures that if no property violation is found, no execution of the program can violate the functional specifications. This approach is exhaustive, contrary to the usual tests-based approaches for verifying functional specifications of PLC programs, which cannot test all possible executions of a program written according to said functional specifications. Therefore, PLC Programs specifications can be unambiguously, completely and automatically specified and verified thanks to the PLC Program analysis method of the present invention.

The method covers all possible executions of the verified PLC program along with its functional specifications. Useful information about error scenarios can therefore be provided in the final step of the method, along with the program code, to indicate where, how and why such an error occurs during execution of the program thanks to the obtained initial and intermediary configurations. The property violation is precisely explained. The initial configuration that leads to the property violation is computed and execution information such as memory assignments is recorded and retrieved, from the initial configuration to the point of the program where the property is violated.

The invention provides a solution to verify functional specifications in addition to ensuring the safety of execution and the soundness of the PLC program. The method detects either runtime errors or functional specifications violations expressed by the programmer in first-order logic, as interlocking properties. The invention provides useful debugging information when a runtime error or a specification violation is found. The invention provides, according to the programming language of the PLC program, all the execution information regarding initial and intermediate configurations that lead to said runtime error or specification violation.

In case a specification violation is detected, all the information needed by the programmer to understand when and why the specification is violated is displayed. Such information typically includes the initial and intermediate values of memory that lead to said specification violation.

The program can be printed with additional information relative to memory values during the execution, such as initial and intermediary values that lead to property violation and how to fix the bug. Therefore, the method allows automatic debugging as no human intervention is needed to determine tests to run, supervise their execution and analyse their results.

The method also allows faster debugging as it relies on property verification instead of consecutively executing the program under multiple test configurations to simulate, as it is the case of automated simulation which has limitations for complex programs of industrial size. Execution time on a central processing unit is therefore reduced. A PLC program of typical industrial size can be verified in a few seconds through the PLC program analysis method of the present invention.

Thanks to these dispositions, there is provided an efficient, exhaustive and fast tool for safely reducing PLC programs time-to-deploy and increasing confidence in PLC programs in the factory automation industry.

The program model is preferably expressed in the first-order logical framework, which can be mathematically provable, and is therefore useful in representing computational problems. Moreover, first-order logic is adapted to express properties derived from PLC program models and corresponding functional specifications, and generation of first-order logic properties is easier to automate compared to superior logical frameworks.

According to an embodiment, the step of translating user specifications into a specification model comprises an intermediary step where the user specifications are expressed using functional specifications templates and a selection of devices used by the PLC program.

User specifications describe the functions that the PLC program is expected to perform and are generally written prior to the PLC program which is developed according to said user specifications. The PLC program functions are usually specified in natural language, which results in user specifications expressed in informal language. This intermediary step of the user specifications translation step allows expressing said user specifications in a formal language.

This way, the specification model is generated in a logical framework from the user specifications that have been expressed using functional specifications templates and the selection of devices used by the PLC program. The selection of devices used by the PLC program might be provided from said program model. The generated specification model is therefore related to the program model. According to an embodiment, the step of translating the original program into the program model comprises a first intermediary step of expression of said original program as an Abstract Syntax Tree, and a second intermediary step of generation of the program model from said Abstract Syntax Tree.

Implementation of such intermediary steps is advantageous as an Abstract Syntax Tree can be enhanced with information such as properties and annotations for every element it contains. Said Abstract Syntax Tree is preferably described in a functional language such as OCAML. An Abstract Syntax Tree also allows storing the position of each element in the PLC program, which is useful in retrieving error intermediary configurations during the simulated execution of the program model.

To that end, the step of simulating the program model execution preferably comprises:
  a first intermediary step of translating said program model error initial configurations into error initial configurations corresponding to the Abstract Syntax Tree;
  a second intermediary step of computing the Abstract Syntax Tree with said corresponding initial configurations and retrieving intermediary values of internal memory corresponding to the Abstract Syntax Tree.

The Abstract Syntax Tree representation is advantageous as it allows generating intermediary values which cannot be obtained by a simple execution of the PLC program, such as values at logical gates connecting instructions.

According to an embodiment, the step of translating the original program into the program model comprises an intermediary step of static single assignment transformation. The static single assignment transformation is preferably applied on the Abstract Syntax Tree representation and is advantageous to keep track of internal memory values during execution.

According to an embodiment, during the step of determining the set of properties, said set of properties is computed using Dijkstra's weakest precondition calculus to determine preconditions on said set of properties, verification of said set of properties being performed on the basis of preconditions thereof. Preconditions are underlying hypotheses that are inherent to a property. A satisfied precondition implies that the property is verified and that no error occurs during execution thereof.

According to an embodiment, satisfiability of said set of predicates coupled with interlocking properties is verified using a Satisfiability Modulo Solver, which is an automated solver configured to solve satisfiability modulo theories problems, which are decision problems expressed in first-order logic as logical formulas.

According to another aspect of the present invention, it is disclosed a computer program comprising instructions for performing the method as described hereinbefore, when these instructions are run by at least one processor.

In a preferred embodiment, said computer program is executed on a deductive program verification platform.

The invention further aims at a non-transitory computer readable medium storing a computer program according to the invention, and causing a computer to execute the steps of the method as defined above.

Figure 7:
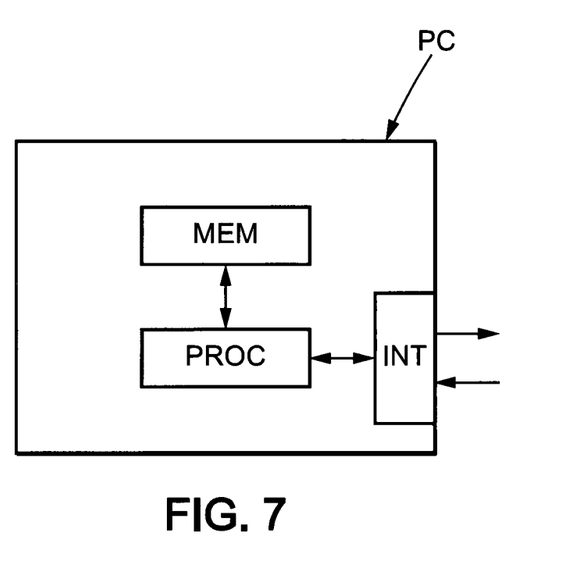
FIG. 7 illustrates an apparatus for executing the disclosed method.

According to another aspect of the present invention, it is disclosed an apparatus for executing a Programmable Logic Controller Program analysis method as described hereinbefore. Such an apparatus can include, in an embodiment, a processing circuit PC (as shown in the example of FIG. 7) comprising:
  A memory MEM storing the aforesaid computer program instructions, and possibly also other data such as transitory calculation data,
  A processor PROC for reading the content of memory MEM and performing the steps of the method according to the invention, and
  Possibly an input/output interface INT to receive/send data (through a network or any other link) to be processed/processed by the processor PROC.

BRIEF DESCRIPTION OF DRAWINGS

Other features and advantages of the invention appear from the following detailed description of one of its embodiments, given by way of non-limiting example, and with reference to the accompanying drawings, in which, further than FIG. 7 commented above.

DESCRIPTION OF EMBODIMENTS

In the figures, the same references denote identical or similar elements.

Figure 1:
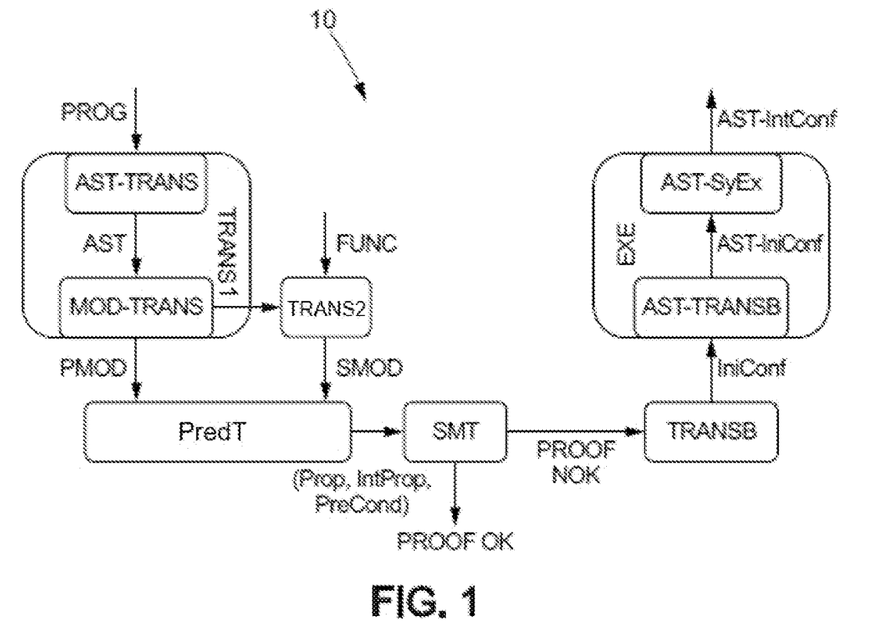
FIG. 1 illustrates an exemplary set of steps involved in the disclosed method.

FIG. 1 shows an exemplary set of steps designated by reference numeral 10 and involved in a PLC program deductive verification. The set of steps represents the global architecture of an implementation of the method of analyzing and verifying a PLC program.

In the example represented in FIG. 1, the method comprises seven steps. The first six steps are applicable to a PLC program written in any PLC programming language. The seventh step is implemented depending on the programming language in which the PLC program is written. FIG. 1 represents the following steps of the method according to the present invention:

During the first step (TRANS1) of the method, a PLC program (PROG) is translated into a program model (PMOD);

During the second step (TRANS2), functional specifications are translated into a specification model (SMOD). The specification model (SMOD) is expressed in a logical framework from the program model (PMOD), and is generated using specification templates and a selection of devices used by the PLC program. Functional specifications are advantageously expressed on a graphical interface that displays functional specifications templates to be used for expressing formally said functional specifications. More precisely, the functional specifications templates are displayed on the graphical interface along with the selection of devices used by the PLC program;

During the third step (PredT), properties to verify are generated from the program model (PMOD), the specification model (SMOD) and predefined PLC language formalization;

During the fourth step (SMT) of the method, an automated solver is used to either formally prove the properties generated in the third step or find counterexamples to these properties;

During the fifth step (TRANSB), properties counterexamples (PROOF NOK)—if there are any—are translated into model configurations, and more particularly into initial model configurations; During the sixth step (EXE), an execution of the PLC program is simulated in order to compute all the intermediary values of internal memory from the model's initial configurations obtained in the fifth step. This step is optional if all the intermediate values were provided in the properties counterexamples returned in the fourth step;

During the seventh step (DISP), model intermediate values are translated back into a PLC program with intermediate values information. When the used PLC language is Ladder Logic, the result is printed to the user in a graphical way, analogously to the original Ladder program.

The first step (TRANS1) of the method is a translation step, consisting in translating a PLC program (PROG) into a program model (PMOD).

Said PLC program PROG is executable on a programmable logic controller hereinafter referred to as PLC. A PLC is capable of storing and executing instructions, such as sequencing, timing, counting, arithmetic, data manipulation, and communication, in order to control industrial machines and processes. Interfacing circuitry to field devices is provided in the form of input and output connections.

Figure 3:
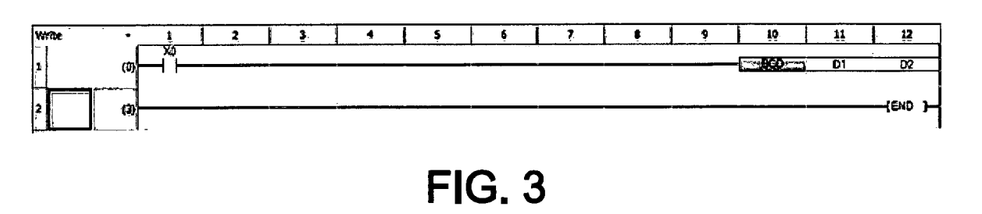
FIG. 3 represents an example of a Ladder diagram, in a particular embodiment of the disclosed method.

In a particular embodiment, the PLC program is written in the Ladder logic, and a Ladder diagram represents the sequential control logic of the PLC program in a graphical diagram. The Ladder language is a graphical language which mimics a relay logic electrical schematic as shown in FIG. 3 which represents an example of a Ladder diagram. The Ladder logic is actually a rule-based language. Rules, also called "rungs", are instantiated when activated by conditions in a set of data. A set is selected according to said activation and the statements belonging to those rules execute. When implemented with electromechanical devices such as relays, the various rules which make up the program are executed sequentially in a continuous loop as part of a software. An effect of simultaneous and immediate execution can be achieved by executing the loop many times per second. Rungs are executed in a given order to achieve proper operation of programmable controllers. More particularly, a Ladder program can comprise one loop executed successively, for example every 100 milliseconds.

Rung inputs are logical checkers, also referred to as "contacts". So-called "contacts" may refer to physical or hard inputs to the programmable controller from physical devices such as pushbuttons and limit switches via an integrated or external input module. Contacts may also represent the status of internal storage bits which may be generated elsewhere in the program.

Rung outputs are actuators represented by "coils". The "coil" may represent a physical output which operates some device connected to the programmable controller, or may represent an internal storage bit for use elsewhere in the program. Each contact or coil corresponds to the status of a single bit in the programmable controller's memory. These instructions provide the ability to examine the ON/OFF status of specific bit addresses in memory and control the state of internal and external outputs. Unlike electromechanical relays, a Ladder program can refer any number of times to the status of a single bit, equivalent to a relay with an indefinitely large number of contacts.

In the Ladder diagrams, rungs are constructed as a network of connected instructions. Connections between instructions represent the logic relationship between said instructions. For example, in Ladder logic the OR logic is implemented with a parallel connection of two contacts, whereas AND logic is implemented with Ladder logic as a serial connection of contacts.

The translation operated in the first step (TRANS1) is performed by implementing a translation algorithm. The translation algorithm uses predefined modelizations of PLC language primitives, to translate the PLC program (PROG) into a program model (PMOD) expressed in a logical framework. PLC language primitives consist of logic instruction elements which constitute PLC logical circuits, such as logical checkers represented by contacts, actuators represented by coils, function blocks and more generally any basic or enhanced Ladder language instructions.

The program model (PMOD) is preferably expressed in the logical framework of first-order logic. First order logic is an extension of propositional logic and considers whether propositions are true or false in a partial view of the world, called a domain. First order logic consists of an alphabet, a first order language, a set of axioms and a set of inference rules. As first order logic can be mathematically provable, it is useful in representing computational problems. First order logic is made up of syntax and semantics. The syntax of first order logic is a formal language used to express concepts, the semantics of first order logic formulae determining the value of any first order logic formula.

Given the sequential structure of PLC programs, the translation is operated only on the instructions comprised in the loop itself. Therefore, expression of the program model in temporal logic is not required, as the program doesn't involve successive execution of loops. During the first step of translation, algebraic datatypes are used to modelize inputs, internal memory and outputs of the program, whereas polymorphic types are used to factorize the number of model primitives.

Modelling of instructions consists in expressing them as first-order formulas, to represent predicates. A predicate is basically a binary-valued function of binary and non-binary variables. Authorized values of inputs and local memory at execution time can be obtained from such predicates. Instructions modelizations may be associated to properties, represented as first-order formulas, that express the authorized values of inputs and local memory at execution time, i.e. the values for which the instruction does not raise an error when it is executed. These formulas may be linked to additional information, like the instruction and the error reason they refer to.

The PLC program model (PMOD) is generated using a mathematical statement comprising said predicates. In other words, the goal of the PLC program is expressed with a set of predicates in a chosen mathematical logic. The verification of such mathematical statement ensures that the computational approach of a program is correct. Verification of such mathematical statement makes explicit the reasons why the computational approach performs what it is expected to calculate. Such verification is also called a proof, and ensures the safety of execution and the soundness of the program associated with the mathematical statement. Safety of execution is ensured if it is proven that, during the program execution, no runtime errors—such as an illegal access to memory or overflow, an illegal operation like an attempt to divide by 0 or, in the case of other types of programs involving successive executions of loops, termination issues like an infinite loop—are encountered. The program soundness is also referred to as functional correctness and consists in verifying that the program does what it is supposed to do.

In formal logic, a logical system has the soundness property if and only if every formula that can be proved in the system is logically valid with respect to the semantics of the system. In other words, a system is sound when all of its theorems are tautologies. Soundness of a deductive system is the property that any sentence that is provable in that deductive system is also true on all interpretations or structures of the semantic theory for the language upon which that theory is based.

In a preferred embodiment, the first step (TRANS1) comprises a first intermediary step (AST-TRANS) where the PLC program is firstly represented as an Abstract Syntax Tree, also known as an AST representation or syntax tree and hereinafter referred to by the acronym AST. The PLC model is then generated from the AST representation of the PLC program in a second intermediary step (MOD-TRANS).

An abstract syntax tree is a tree representation of the abstract syntactic structure of source code written in a programming language. Each node of the tree denotes a construct occurring in the source code, which is, in the present embodiment, the PLC program.

An AST can be edited and enhanced with information such as properties and annotations for every element it contains. Such editing and annotation is impossible with the source code of the PLC program, since it would imply changing it.

Compared to the PLC program, its AST does not include every detail appearing in the real syntax, but rather just the structural and content-related details such as braces, semicolons or parentheses. A syntactic construct like an if-condition-then expression may be denoted by means of a single node with three branches.

An AST usually contains extra information about the program, due to the consecutive stages of analysis by a compiler. Representation of the PLC program in AST is advantageous as it allows storing the position of each element in the PLC program, which is useful in the following steps of the method. This intermediary step is also interesting as a complete traversal of the AST generally allows verification of the correctness of the program.

In the present embodiment, said AST representation is preferably described in a functional language such as OCAML.

Figure 4A:
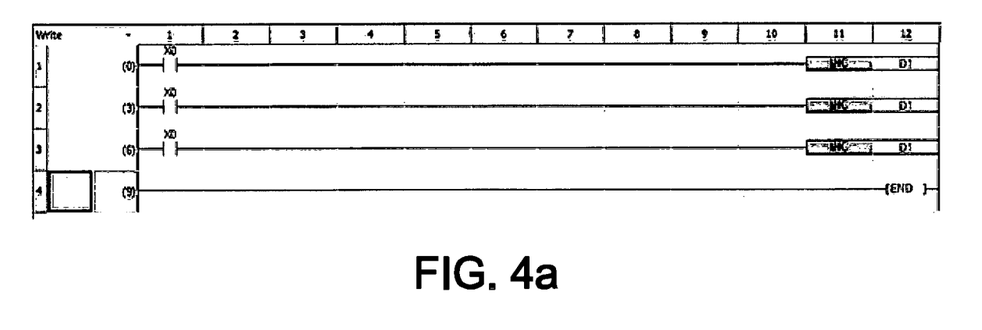
FIG. 4a illustrates execution result of intermediary step involved in the disclosed method.
Figure 4B:
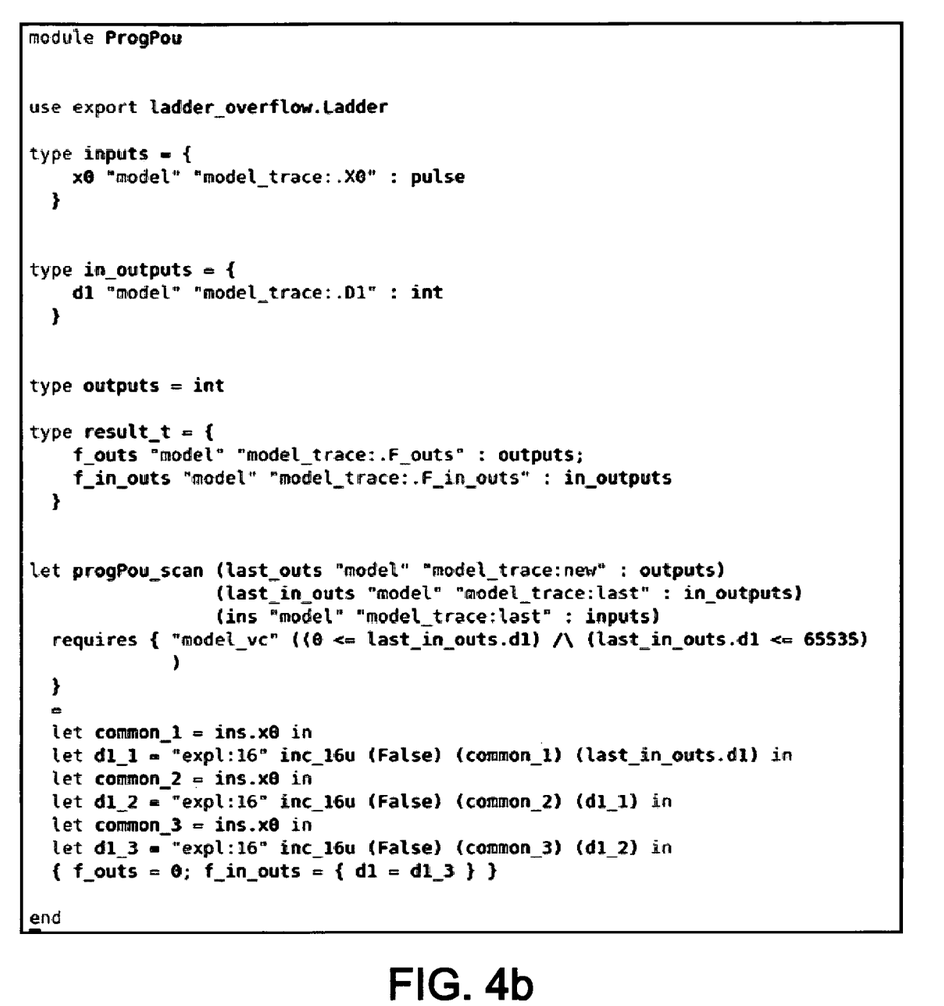
FIG. 4b illustrates execution result of intermediary step involved in the disclosed method.

In a preferred embodiment, the translation algorithm comprises a third intermediary step where static single assignment transformation (SSAT) is used to keep track of internal memory values during the execution of the program. In imperative programming languages such as PLC languages, assignments allow variables to hold different values at different times during their life-span and scope. Static single assignment transformation is advantageous to keep track of values assigned at each stage of execution. In order to perform deductive verification on a program written in an imperative language, transformation into a functional model can be implemented and, if so, performed on the model, more particularly on the AST representation, thanks to the static single assignment transformation. Static single assignment transformation can be seen as a linking step that allows adding information to model elements, like code locations, in order to link them to PLC program elements. Therefore, tracing back to the original PLC program (PROG) can be easily performed. FIG. 4b provides an example of such a static single assignment transformation, where the values of the integer D1 at different steps of the model execution are stored as the values of (d1_1, d1_2, d1_3). The equivalent of this transformation is represented in the Ladder diagram of FIG. 4a.

Figure 2:
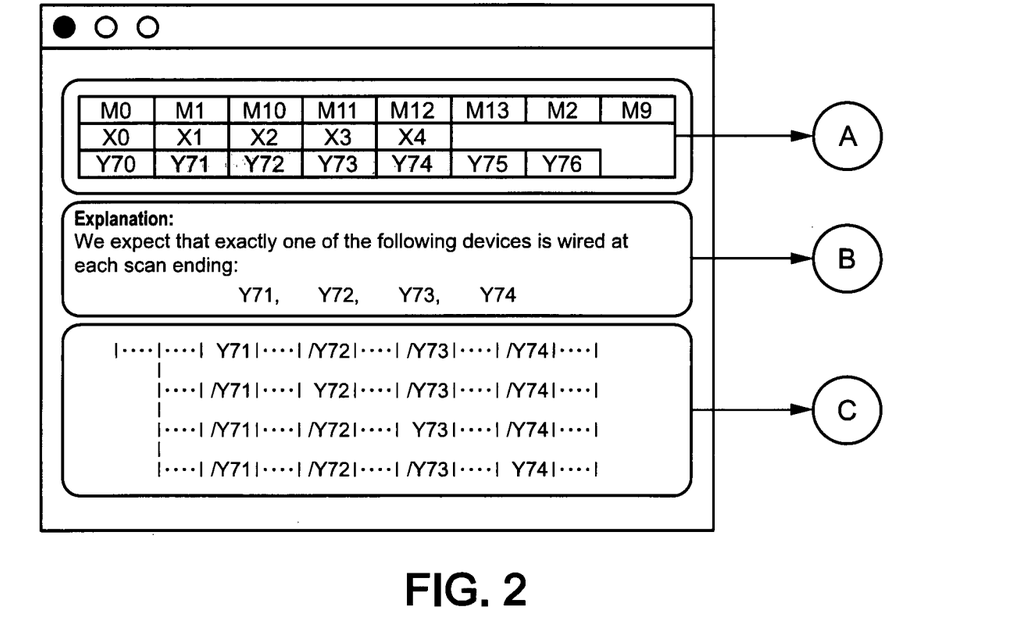
FIG. 2 represents a part of a graphical interface for implementing a step of the disclosed method.

FIG. 2 illustrates an excerpt of an exemplary graphical interface used to perform the second step.

The second step (TRANS2) of translation of user specifications into a specification model is advantageously implemented through a graphical user interface for fully and automatically expressing and specifying functional specifications of a PLC program. This second step allows expressing and specifying functional specifications of the PLC program in an exhaustive manner thanks to the use of deductive verification tools.

In a particular embodiment, the second step (TRANS2) of translation of user specifications into a specification model is performed as the user is expressing the functional specifications. In an advantageous embodiment, the user expresses the functional specifications through a graphical interface. Functional specifications templates, based on the program model, can be suggested to the user as the functional specifications are being input through the graphical interface. Expression of functional specification is made easy and unambiguous. Functional specifications templates are advantageously suggested to the user along with a list of devices used by the PLC program and that can therefore be used to express a functional specification. In FIG. 2, part A represents the list of devices that the user can select with a click.

Compared to classical techniques of functional specification expression and verification, this step allows stating functional specifications precisely in the form of logic properties, thanks to the use of templates that are proposed to the user. As a result, the specification model (SMOD) is generated on the basis of logic properties that correspond to the functional specifications and is expressed in a logical framework.

Live feedback is given to the user as the functional specifications are being translated into the specification model. Live feedback is given in natural language, as illustrated in part B of FIG. 2, as well as in Ladder-like language as illustrated in part C of FIG. 2. This way, the user is able to express functional specifications with no ambiguity. Regardless of the programming language used for the original PLC program, the feedback regarding the expressed functional specifications can be given to the user in a graphical way such as a Ladder diagram.

The third step (PredT) of the method consists in generating properties (Prop) from the PLC program model (PMOD). The third step combines the program model (PMOD) with predefined language formalization (LForm), to obtain properties (Prop) related to said program model (PMOD). Conditions (Cond) on said properties are then obtained.

Such properties are representative of the operations performed at the program model execution, and are expected to be verified at each stage of the execution. They are similar to verifying a loop invariant at each recursive call. Conditions on said properties can be classified into two categories: preconditions and post-conditions.

The preconditions (PreCond) indicate underlying hypotheses that are inherent to a property (Prop) and that should be verified before its execution; otherwise an error may occur. More particularly, when a routine is called, preconditions corresponding to said routine properties are supposed to be satisfied so that said routine properties are verified.

For example, a factorial function program comprises a loop which is representative of a recursive calculus performed on a variable. A precondition of such loop is that the variable of which the factorial is calculated must be a positive integer at the beginning of the loop.

Post-conditions are representative of the result expected when a routine is called with the preconditions being verified. Preconditions of a routine property can therefore be deduced from the result expected at the end of the routine upon property computation. In the case of loops, preconditions and post-conditions are closely related or even similar and form the loop invariant, in particular in programs involving successive executions of loops. If a post-condition is satisfied at a stage of execution of the loop, then it is ensured that the precondition of the next stage is satisfied as well.

Figure 5:
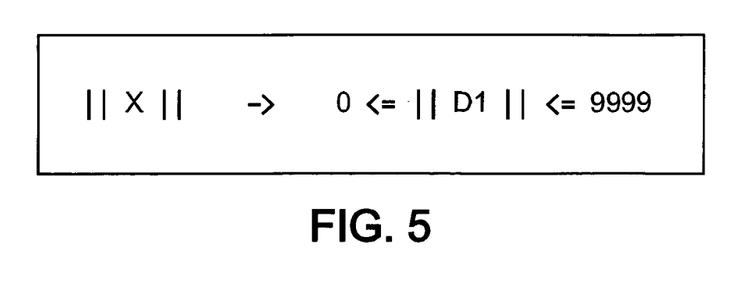
FIG. 5 illustrates another execution result of an intermediary step involved in the disclosed method.

To that end, this third step (PredT) uses Dijkstra's weakest precondition calculus to compute said properties and determine the preconditions (PreCond) related to the model properties (Prop). FIG. 5 illustrates an example of a property generated and computed in the third step to obtain preconditions. The property of FIG. 5 can be read as follows:" If the value stored in X is "ON"/"True" then the value stored in D1 is greater than 0 and less than 9999". Another example of a property that can be generated and computed in the third step is expressed as follows:

$$\|X\| \rightarrow (Y1 \text{ and } (\text{not } Y2)) \text{ or } ((\text{not } Y1) \text{ and } Y2)$$

This property represents the fact that" If the value stored in X is "ON"/"True" then one and only one of the outputs Y1 and Y2 has a stored value "ON"/"True"".

Execution of Dijkstra's weakest precondition calculus on first-order logic properties ensures that such a computation is sound, while minimizing the size of computed properties. Preconditions provide the definition domain of each property. This step ensures the soundness of the proof, as a satisfied precondition implies that the routine property holds and that no error occurs during execution thereof. Consequently, if properties are satisfied, or, in other words, the contraposition of said properties is not satisfiable, then no error can happen when executing the corresponding PLC program.

In an advantageous embodiment, other properties are expressed from user specifications (FDNC). User specifications are also referred to as functional specifications and describe the expected behavior of the program, i.e. the functions that a program must perform to meet what is needed by a program user, as well as requested properties of inputs and outputs. For example, in an industrial context, a robot arm can be requested to operate only when a sensor is receiving a signal within a given range. Other examples of user specifications comprise conditions of the following types: "two or more particular outputs should not be activated at once"; "if one or more particular inputs are activated, then one or more particular outputs should/should not be activated"; "one and only one output among particular outputs should be activated at a time".

The program as written is supposed to conform to said specifications; however, computing properties derived from user specifications is an additional safety measure since the written program can contain runtime errors. These properties are interlocking properties (IntProp) and are obtained by expressing functional specifications in first-order logic. More particularly, interlocking properties (IntProp) are obtained from the specification model (SMOD) that is obtained in the second step (TRANS2). Said interlocking properties are computed with the model's properties as additional post-conditions to satisfy. Preconditions (PreCond) can therefore be derived from these interlocking properties as well, with the use of Dijkstra's weakest precondition calculus.

Superior logical frameworks can be used also in the first, second and third steps; however, first-order logic is generally adequate to express properties derived from PLC models (Prop) and corresponding functional specifications (IntProp). Superior logical frameworks may introduce unnecessary complexity regarding the final application. Moreover, generation of first-order logic properties is easier to automate compared to superior logical frameworks.

Computation of properties derived from functional specifications ensures that when the model's properties are satisfied, no error deriving from a violation of functional specifications occurs at execution time.

The third step is also known as predicate transformation and is preferably computed on a deductive program verification platform (PLAT), which comprises appropriate tools to receive the program model as an input and generate formal proofs of various programs. The first step is also preferably computed on a deductive program verification platform (PLAT). More particularly, the static single assignment transformation of the first step can be performed by the deductive program verification platform (PLAT). Instructions modelization may be performed through an external modelization tool, which can consist in a library downloaded in said deductive program verification platform and comprising predefined templates and models of PLC languages. In an advantageous embodiment, said platform (PLAT) is of the type of WHY3, and the program model (PMOD) is expressed in a programming language of the type of WHYML.

The fourth step (SMT) of the method uses an automated solver in order to either formally prove the properties generated in the third step, or to find counter-examples to these properties. Said generated properties are formally proven if they are always satisfied, or if the contraposition thereof is not satisfiable. Satisfiability of said properties (Prop) or contraposition thereof is evaluated in accordance with their previously defined preconditions (PreCond).

In a preferred embodiment, the fourth step is performed by an automatic theorem prover for satisfiability modulo theories (SMT) problems, which can be used to prove the validity—or, dually, the satisfiability—of first-order formulas in a large number of built-in logical theories and their combination. Such a solver is configured to solve satisfiability modulo theories problems, which are decision problems expressed in first-order logic as logical formulas. An SMT-problem is a SAT problem in which propositional variables are replaced with formulas of another mathematical theory. More specifically, an SMT problem is expressed as a set of SMT instances which are formulas in first-order logic with additional interpretations.

The deductive program verification platform previously used in the third step generally includes automatic solvers as well. Therefore, it may be used to compute the fourth step as well. An example of a solver that may be used preferably is CVC4. Another example can be Z3 and Alt-Ergo. The solver must be configured to interact properly with the platform to run the proof and provide counterexamples. Said interaction includes indications of model elements on which proof or counterexamples are required. In the preferred embodiment where said platform (PLAT) is WHY3, model elements on which proof or counterexamples are required can be labelled by specific functions in the WHYML language, as can be seen on FIG. 4b with the label "model-trace".

Resolution is performed heuristically with respect to background theories and consists in determining if the SMT instance is satisfiable. The automatic theorem prover advantageously includes model generation abilities which are a key-feature for providing counterexamples. The properties obtained from the third step are resolved at least with respect to the theory of integer linear arithmetic, and preferably the theory of records, linear real arithmetic and strings. In an advantageous embodiment, the automatic theorem prover is based on first-order logic with polymorphic types and preferably includes built-in base theories such as rational and integer linear arithmetic, arrays, tuples, records, inductive data types, bit-vectors, strings, and equality over uninterpreted function symbols. In a more preferred embodiment, such automatic theorem prover further includes support for quantifiers.

If properties (Prop, IntProp) obtained at the third step are satisfied upon computation thereof with the use of an SMT solver, a response (PROOF OK), representative of the proof that the properties are satisfied, is generated by the SMT-solver. It is then ensured that no instructions of the program (PROG) can error at production time, and/or that the functional specifications (FUNC) expressed by the user, hold for all possible executions of the PLC program (PROG). The soundness of the program (PROG) is therefore demonstrated.

Otherwise, if the contraposition of a property (Prop, IntProp) is satisfiable, a counterexample to the property is provided by the solver. A response (PROOF NOK) representative of said counterexample is generated by the SMT-solver, and corresponds to a model configuration that leads to the case where said property is not satisfied. In particular, the content of the counterexample refers at least to initial configurations as the formal proof is evaluated on the basis of preconditions (PreCond).

The fifth step of the method translates (TRANSB) the obtained properties counterexamples (PROOF NOK) into model configurations, and more particularly into initial model configurations. Said model configuration comprises model's inputs and internal memory values. This translation is performed on the basis of said predefined language formalization (LForm), and operates as a reverse of the properties generation process in the third step from the program model (PMOD).

The obtained properties counterexamples comprise data that corresponds to both initial (IniConf) and intermediary (IntConf) model configurations, as the program model and the deductive verification process are functional. Said initial model configurations (IniConf) comprise initial values of model's inputs and internal memory at the beginning of the execution of the program model (PMOD), that lead to the case where said property is not satisfied. Said intermediary model configurations comprise intermediary values of internal memory, between the beginning of the execution of the program model (PMOD) and the model location where said property is not satisfied.

However, said counterexamples don't comprise all of the intermediary values generated during execution. For example, four values may be assigned to a PLC program variable X during execution thereof. The four values are therefore assigned to four intermediary variables (X1, X2, X3, X4) that are representative of the variable X. The obtained counterexamples may, in some cases, not return the values corresponding to all of the intermediary variables (X1, X2, X3, X4).

As detailed below, a preferred method to overcome this case is to select initial configurations from the obtained counterexamples, and to recompute the values of the intermediary variables (X1, X2, X3, X4) by executing the program model with said initial configurations (IniConf) selected from the counter examples.

The sixth step consists in simulating the execution (EXE) of the PLC program in order to compute the intermediary values of internal memory from the model's initial configurations obtained in the fifth step.

In a preferred embodiment, the sixth step comprises a first intermediary step (AST-TRANSB) consisting in translating the model initial configurations (IniConf) obtained in the fifth step, into corresponding initial configurations (AST-IniConf) of the AST representation, preferably expressed in OCAML language. Such a translation can be derived from the translation of the AST representation into the model as operated in the first step.

The sixth step comprises a second intermediary step (AST-SyEx) consisting in computing the AST representation by a Simulated Execution Engine, with said corresponding initial configurations (AST-IniConf), in order to retrieve and record intermediary values of the AST representation internal memory (AST-IntConf). The AST representation execution operates as a simulation of the PLC program execution. Collection of intermediary values is performed to the point of the execution where an error or a specification violation happens. The sixth step may be performed on said deductive program verification platform as well.

The AST representation is then advantageous as it allows generating intermediary values which cannot be obtained by execution of the PLC program. One reason for this is that in the program model, the logical gates connecting instructions aren't represented as variables. Therefore, errors occurring at such code locations aren't made explicit in the returned counterexamples. Upon translation in the first step, values at these code locations are lost and are not retrieved among the counterexamples values provided upon the fourth step. Values at these code locations, though, are essential for a proper interpretation of what caused the error. The sixth step also allows retrieval of values at these code locations, thanks to the execution of the AST representation on which single static assignment has been applied.

This sixth step provides model error scenarios, through which the values leading to an error or a specification violation are collected. Model error scenarios are based on the AST representation configurations (AST-IniConf, AST-IntConf).

The seventh step (DISP) translates back the model error scenarios to the PLC program. The AST representation configurations (AST-IniConf, AST-IntConf) are translated back to corresponding configurations of the PLC program. The seventh step of the PLC program analysis method is language-focused and is implemented depending on the programming language in which the PLC program is written. Thanks to the extra-information about the original program contained in the AST, generated during the first step (TRANS1) and kept during the different processes and translations of the following steps, the method is able to give back error scenarios to programmers. This information is conveniently represented in the form of the program itself enriched with indications for programmers to understand why and when functional specification violations or runtime errors happen and how to fix the PLC program. In the particular case of Ladder programming, this representation of error scenarios can be displayed in a graphical way.

Figure 6:
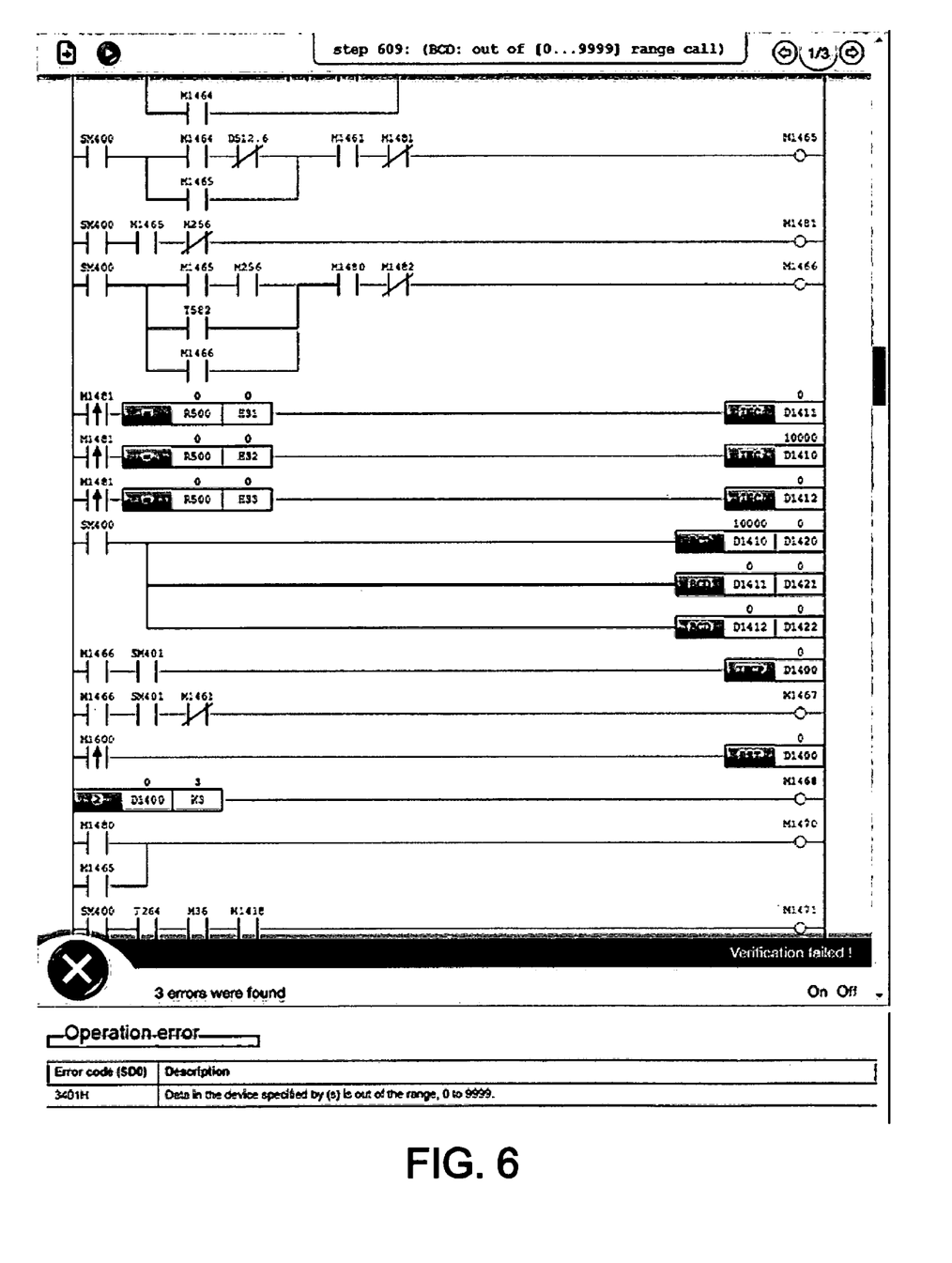
FIG. 6 illustrates an error scenario as a result of the disclosed method execution.

FIG. 6 illustrates an error scenario with colours for binary values and labels for integers values of said error scenario. In case the PLC program is written in Ladder programming language, the Ladder program is graphically displayed as shown in FIG. 6, and is enriched with information relative to: error locations in the program; execution paths prior to said error and which are for example indicated with color highlights; values of inputs and internal memory from the beginning of the program execution up to the error or specification violation. Error scenarios, together with error location and reasons information added to the program model in the first step, give very complete information on the error that was found and how to fix it.

FIG. 7 illustrates an apparatus for executing the Programmable Logic Controller Program analysis method as described hereinbefore. Such an apparatus includes, in the illustrated embodiment, a processing circuit PC comprising:

A memory MEM storing the computer program which comprises instructions for performing the method according to the invention, and possibly also other data such as transitory calculation data, A processor PROC for reading the content of memory MEM and performing the steps of the method according to the invention, and Possibly an input/output interface INT to receive/send data (through a network or any other link) to be processed/processed by the processor PROC.

The invention claimed is:
1. A Programmable Logic Controller Program analysis method comprising the following steps:
translating an original program of the type of a Programmable Logic Controller Program, into a program model in a logical framework;
translating, based at least on said program model, user specifications into a specification model in a logical framework;
determining, from at least said program model and predefined language formalization, a set of properties on internal variables of said original program;
verifying, by an automated solver, satisfiability of said set of properties coupled with interlocking properties obtained from the specification model and providing, if contraposition of a property from said set of properties is satisfiable, a set of counter-examples representative of program model's inputs and internal memory values for which said property contraposition is satisfiable, or providing, if said set of properties is always satisfied, confirmation thereof;
translating counter-examples, into error initial configurations of said program model, said initial configurations comprising initial values of inputs and internal memory;
simulating the execution of the program model with error initial configurations of said program model, and recording error intermediary configurations of said program model simulation, from the beginning of execution up to said property violation, said intermediary configurations comprising intermediary values of internal memory;
translating error initial configurations of said program model and error intermediary configurations of said program model simulation, into error initial and intermediary configurations of said original program; and
displaying said program error initial and intermediary configurations.

2. The Programmable Logic Controller Program analysis method according to claim 1, wherein the step of translating user specifications into a specification model comprises an intermediary step where the user specifications are expressed using functional specifications templates and a selection of devices used by the Programmable Logic Controller program.

3. The Programmable Logic Controller Program analysis method according to claim 1, wherein the step of translating the original program into the program model comprises a first intermediary step of expression of said original program as an Abstract Syntax Tree, and a second intermediary step of generation of the program model from said Abstract Syntax Tree.

4. The Programmable Logic Controller Program analysis method according to claim 3, wherein the step of simulating model execution comprises:
a first intermediary step of translating said model error initial configurations into error initial configurations corresponding to the Abstract Syntax Tree,
a second intermediary step of computing the Abstract Syntax Tree with said corresponding initial configurations and retrieving intermediary values of internal memory corresponding to the Abstract Syntax Tree.

5. The Programmable Logic Controller Program analysis method according to claim 1, wherein the program model is expressed in the first-order logical framework.

6. The Programmable Logic Controller Program analysis method according to claim 1, wherein the step of translating the original program into the program model comprises an intermediary step of static single assignment transformation.

7. The Programmable Logic Controller Program analysis method according to claim 1, wherein, during the step of determining the set of properties, said set of properties is computed using Dijkstra's weakest precondition calculus to determine preconditions on said set of properties, verification of said set of properties being performed on the basis of preconditions thereof.

8. The Programmable Logic Controller Program analysis method according to claim 1, wherein satisfiability of said set of properties coupled with interlocking properties is verified using a Satisfiability Modulo Solver.

9. A non-transitory computer readable medium for storing a computer program comprising instructions for performing the method as claimed in claim 1, when these instructions are run by a processor.

10. An apparatus for executing the computer program according to claim 9, wherein the apparatus comprises a memory storing the computer program and the processor connected to the memory.

* * * * *